(12) United States Patent
Huang et al.

(10) Patent No.: US 7,286,978 B2
(45) Date of Patent: *Oct. 23, 2007

(54) CREATING A LANGUAGE MODEL FOR A LANGUAGE PROCESSING SYSTEM

(75) Inventors: Xuedong D. Huang, Woodinville, WA (US); Milind V. Mahajan, Redmond, WA (US); Ye-Yi Wang, Redmond, WA (US); Xiaolong Mou, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 18 days.

This patent is subject to a terminal disclaimer.

(21) Appl. No.: 11/401,507

(22) Filed: Apr. 11, 2006

(65) Prior Publication Data

US 2006/0184354 A1  Aug. 17, 2006

Related U.S. Application Data

(63) Continuation of application No. 09/585,298, filed on Jun. 1, 2000, now Pat. No. 7,031,908.

(51) Int. Cl.
*G06F 17/27* (2006.01)
(52) U.S. Cl. .......................................... 704/9
(58) Field of Classification Search .................... 704/1, 704/9
See application file for complete search history.

(56) References Cited

U.S. PATENT DOCUMENTS

| | | | |
|---|---|---|---|
| 4,831,550 A | 5/1989 | Katz | |
| 4,945,566 A | 7/1990 | Mergel et al. | |
| 4,947,438 A | 8/1990 | Paeseler | |
| 4,984,178 A * | 1/1991 | Hemphill et al. | 704/255 |
| 5,263,117 A | 11/1993 | Nadas et al. | |
| 5,384,892 A | 1/1995 | Strong | |
| 5,477,451 A | 12/1995 | Brown et al. | |
| 5,502,774 A | 3/1996 | Bellegarda et al. | |
| 5,594,641 A * | 1/1997 | Kaplan et al. | 707/1 |
| 5,615,296 A | 3/1997 | Stanford et al. | |
| 5,621,809 A | 4/1997 | Bellegarda et al. | |

(Continued)

FOREIGN PATENT DOCUMENTS

EP   0 645 757 A1   3/1995

(Continued)

OTHER PUBLICATIONS

Galescu, L., E.K. Ringger, and J. Allen, "Rapid Language Model Development for New Task Domains", in Proceedings for the ELRA First International Conference on Language Resources and Evaluation (LREC), 1998, Granada, Spain.

(Continued)

*Primary Examiner*—David Hudspeth
*Assistant Examiner*—Eunice Ng
(74) *Attorney, Agent, or Firm*—Todd R. Fronek; Westman, Champlin & Kelly, P.A.

(57) ABSTRACT

A method for creating a language model from a task-independent corpus is provided. In one embodiment, a task dependent unified language model is created. The unified language model includes a plurality of context-free grammars having non-terminals and a hybrid N-gram model having at least some of the same non-terminals embedded therein.

17 Claims, 8 Drawing Sheets

U.S. PATENT DOCUMENTS

| | | | |
|---|---|---|---|
| 5,625,554 A * | 4/1997 | Cutting et al. | 707/100 |
| 5,680,511 A | 10/1997 | Baker et al. | |
| 5,689,617 A | 11/1997 | Pallakoff et al. | |
| 5,710,866 A | 1/1998 | Alleva et al. | |
| 5,752,052 A | 5/1998 | Richardson et al. | |
| 5,765,133 A | 6/1998 | Antoniol et al. | |
| 5,819,220 A | 10/1998 | Sarukkai et al. | |
| 5,829,000 A | 10/1998 | Huang et al. | |
| 5,835,888 A | 11/1998 | Kanevsky et al. | |
| 5,878,390 A * | 3/1999 | Kawai et al. | 704/231 |
| 5,899,973 A | 5/1999 | Bandara et al. | |
| 5,905,972 A | 5/1999 | Huang et al. | |
| 5,913,193 A | 6/1999 | Huang et al. | |
| 5,937,384 A | 8/1999 | Huang et al. | |
| 5,963,903 A | 10/1999 | Hon et al. | |
| 6,032,111 A * | 2/2000 | Mohri | 704/9 |
| 6,073,091 A | 6/2000 | Kanevsky et al. | |
| 6,081,799 A | 6/2000 | Beavin et al. | |
| 6,141,641 A | 10/2000 | Hwang et al. | |
| 6,154,722 A | 11/2000 | Bellegarda | |
| 6,157,912 A | 12/2000 | Kneser et al. | |
| 6,167,398 A | 12/2000 | Wyard et al. | |
| 6,182,039 B1 | 1/2001 | Rigazio et al. | |
| 6,188,976 B1 | 2/2001 | Ramaswamy | |
| 6,418,431 B1 | 7/2002 | Mahajan et al. | |

FOREIGN PATENT DOCUMENTS

| | | |
|---|---|---|
| EP | 0 687 987 A1 | 12/1995 |
| WO | WO 96/41333 | 12/1996 |
| WO | WO 98/34180 | 8/1998 |

OTHER PUBLICATIONS

Nasr, A., et al., "A Language Model Combining N-grams and Stochastic Finite State Automata", in Eurospeech, 1999.

Wang, Y.-Y, "A Robust Parser for Spoken Language Understanding", in Eurospeech, 1999, Hungary.

Mahajan, M., D. Beeferman, and X.D. Huang, "Improved Topic-Dependent Language Modeling Using Information Retrieval Techniques", in ICASSP, 1999, Phoenix, AZ., USA.

Goodman, J.T., "Putting It All Together: Language Model Combination," Acoustics, Speech, and Signal Processing, 2000. ICASSP '00 Inern'l Conf. On, v. 3, pp. 1647-1650.

Wang, Ye-Yi et al., "A Unified Context-Free Grammar and N-gram Model for Spoken Language Processing," Acoustics, Speech, and Signal Processing, 2000 IEEE Intern'l Conf. On, v. 3, pp. 1639-1642.

Tsukada, H. et al., "Reliable Utterance Segment Recognition by Integrating a Grammar with Statistical Language Constraints," Speech Communications, Elsevier Science Publishers, Dec. 1998, vol. 26, No. 4, pp. 299-309.

Moore, R., "Using Natural-Language Knowledge Sources in Speech Recognition," Computational Models of Speech Pattern Processing, Proceedings of Computational Models of Speech Pattern Processing, Jul. 1997, pp. 304-327.

Tawezawa, T. et al., "Dialogue Speech Recognition Using Syntactic Rules Based on Subtrees and Preterminal Bigrams," Systems & Computers in Japan, Scripta Technica Journals, May 1, 1997, vol. 28, No. 5, pp. 22-32.

Hwang, M.Y., et al. "Predicting unseen Triphones with Senones," IEEE Transactions on Speech and Audio Processing, Nov. 6, 1996, pp. 412-419.

Kawabata, T., et al., "Back-Off Method for N-gram Smoothing Based on Binomial Posterior Distribution," Acoustics, Speech, and Signal Processing, 1996. ICASSP-96, v. 1, pp. 192-195.

Database Inspec 'Online!, Institute of Electrical Engineers, "Improvement of a Probabilistic CFG Using a Cluster-based language Modeling Technique," & "Methodologies for the Conception, Design, and Application of Intelligent Systems," Abstract, 1993.

Huang, X, et al., "Microsoft Windows Highly Intelligent Speech Recognizer: Whisper," 1195, IEEE, pp. 93-96.

Lloyd-Thomas, H., et al., "An Integrated Grammar/Bigram Language Model Using Path Scores," Proceedings of the International Conference on Acoustics, Sppech and Signal Processing, May 9, 1995, vol. 1 pp. 173-176.

Meteer, M., et al., "Statistical Language Modeling Combining N-gram and Context-Free Grammars," Speech Proceesing, Mpls., Apr. 27-30, 1993, ICASSP, New York, IEEE, Apr. 27, 1993, vol. 2, pp. II-37-40.

Lippmann, E.A., et al., "Multi-Style Training for Robust Isolated-Word Speech Recognition," Proceedings of DARPA Speech Recognition Workshop, Mar. 24-26, 1987, pp. 96-99.

U.S. Appl. No. 09/585,298, Office Action, Aug. 12, 2004.

U.S. Appl. No. 09/585,298, Amendment, Dec. 13, 2004.

Mergel, A. et al., "Construction of Language Models for Spoken Database Queries", IEEE, 1987, pp. 844-847.

Ward, W., "Understanding Spontaneous Speech: The Phoenix System", Proceedings ICASSP, 1991, pp. 365-367.

Matsunaga et al., "Task Adaptation in Stochastic Language Models for Continuous Speech Recognition", IEEE Mar. 23, 1992, pp. I-165-I-168.

Moore, R., et al., "Combining Linguistic and Statistical Knowledge Sources in Natural-Language Processing for ATIS", in Proceedings for the ARPA Spoken Language Systems Technology Workshop, 1995, Morgan Kaufmann, Los Altos, CA; Austin, Texas.

PJ Wyard et al., "Spoken Language Systems-Beyond Prompt and Response", BT Technology Journal, Jan. 1996, No. 1, pp. 187-205.

Huang, X., et al., "From Sphinx II to Whisper: Making Speech Recognition Usable, in Automatic Speech and Speaker Recognition", C.H. Lee, F.K. Soong, and K.K. Paliwal, Editors, 1996, Klewer Academic Publishers: Norwell, MA., pp. 481-508.

"Implications of the Perplexity Definition", Eagles Handbook of Standards and Resources for Spoken Language Systems, Online!, May 1997.

Kneser et al., "Semantic Clustering for Adaptive Language Modeling", IEEE, 1997, pp. 770-782.

Mastaki et al., "Task Adaptation Using Map Estimation in N-gram Language Modeling", IEEE, 1997, pp. 783-786.

Niesler et al., "Modeling Word-Pair Relations in a Category-Based Language Model", IEEE, 1997, pp. 795-798.

Bellegarda, J., "A Statistical Language Modeling Approach Integrating Local and Global Constraints", IEEE, 1997, pp. 262-269.

Seneff, S., "The Use of Linguistic hierarchies in Speech Understanding", in ICSLP, 1998, Sydney, Australia.

Gillett, J. and W. Ward, "A Language Model Combining Trigrams and Stochastic Context-Free Grammars", in ICSLP, 1998, Sydney, Australia.

* cited by examiner

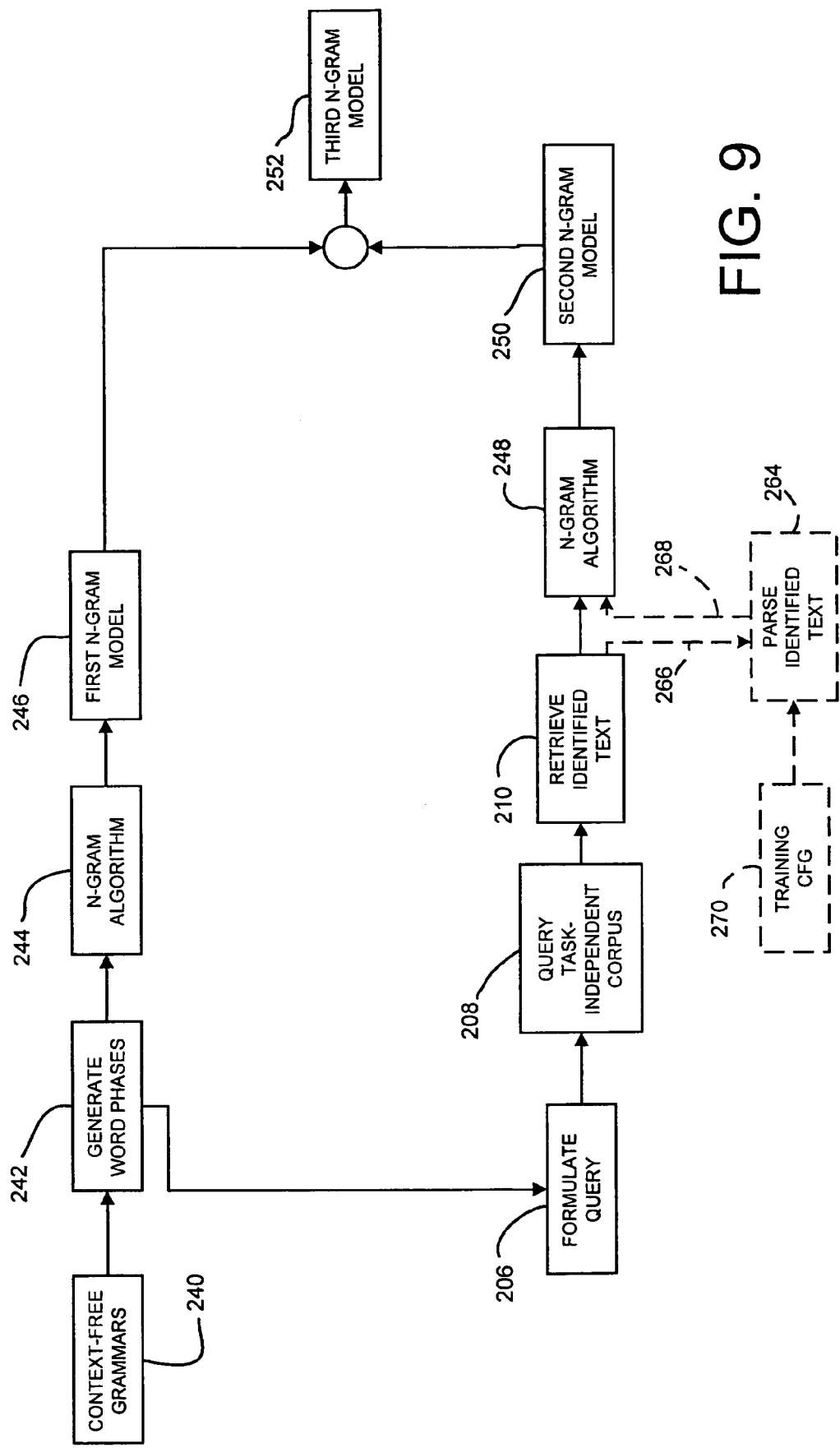

CREATING A LANGUAGE MODEL FOR A LANGUAGE PROCESSING SYSTEM

CROSS-REFERENCE TO RELATED APPLICATION

The present application is a continuation of and claims priority of U.S. patent application Ser. No. 09/585,298, filed Jun. 1, 2000, the content of which is hereby incorporated by reference in its entirety.

BACKGROUND OF THE INVENTION

The present invention relates to language modeling. More particularly, the present invention relates to creating a language model for a language processing system.

Accurate speech recognition requires more than just an acoustic model to select the correct word spoken by the user. In other words, if a speech recognizer must choose or determine which word has been spoken, if all words have the same likelihood of being spoken, the speech recognizer will typically perform unsatisfactorily. A language model provides a method or means of specifying which sequences of words in the vocabulary are possible, or in general provides information about the likelihood of various word sequences.

Speech recognition is often considered to be a form of top-down language processing. Two common forms of language processing includes "top-down" and "bottom-up". Top-down language processing begins with the largest unit of language to be recognized, such as a sentence, and processes it by classifying it into smaller units, such as phrases, which in turn, are classified into yet smaller units, such as words. In contrast, bottom-up language processing begins with words and builds therefrom, larger phrases and/or sentences. Both forms of language processing can benefit from a language model.

One common technique of classifying is to use a formal grammar. The formal grammar defines the sequence of words that the application will allow. One particular type of grammar is known as a "context-free grammar" (CFG), which allows a language to be specified based on language structure or semantically. The CFG is not only powerful enough to describe most of the structure in spoken language, but also restrictive enough to have efficient parsers. Nevertheless, while the CFG provides us with a deeper structure, it is still inappropriate for robust spoken language processing since the grammar is almost always incomplete. A CFG-based system is only good when you know what sentences to speak, which diminishes the value and usability of the system. The advantage of a CFG's structured analysis is thus nullified by the poor coverage in most real applications. For application developers, a CFG is also often highly labor-intensive to create.

A second form of a language model is an N-gram model. Because the N-gram can be trained with a large amount of data, the n-word dependency can often accommodate both syntactic and semantic shallow structure seamlessly. However, a prerequisite of this approach is that we must have a sufficient amount of training data. The problem for N-gram models is that a lot of data is needed and the model may not be specific enough for the desired application. Since a word-based N-gram model is limited to n-word dependency, it cannot include longer-distance constraints in the language whereas CFG can.

A unified language model (comprising a combination of an N-gram and a CFG) has also been advanced. The unified language model has the potential of overcoming the weaknesses of both the word N-gram & CFG language models. However, there is no clear way to leverage domain-independent training corpus or domain-independent language models, including the unified language models, for domain specific applications.

There thus is a continuing need to develop new methods for creating language models. As technology advances and speech and handwriting recognition is provided in more applications, the application developer must be provided with an efficient method in which an appropriate language model can be created for the selected application.

SUMMARY OF THE INVENTION

A method for creating a language model from a task-independent corpus is provided. In a first aspect, a task dependent unified language model for a selected application is created from a task-independent corpus. The task dependent unified language model includes embedded context-free grammar non-terminal tokens in a N-gram model. The method includes obtaining a plurality of context-free grammars comprising non-terminal tokens representing semantic or syntactic concepts of the application. Each of the context-free grammars include words or terminals present in the task-independent corpus to form the semantic or syntactic concepts. The task-independent corpus with the plurality of context-free grammars is parsed to identify word occurrences of each of the semantic or syntactic concepts and phrases. Each of the identified word occurrences are replaced with corresponding non-terminal tokens. A N-gram model is built having the non-terminal tokens. A second plurality of context-free grammars is obtained for at least some of the same non-terminals representing the same semantic or syntactic concepts. However, each of the context-free grammars of the second plurality is more appropriate for use in the selected application.

A second aspect is a method for creating a task dependent unified language model for a selected application from a task-independent corpus. The task dependent unified language model includes embedded context-free grammar non-terminal tokens in a N-gram model. The method includes obtaining a plurality of context-free grammars that has a set of context-free grammars having non-terminal tokens representing task dependent semantic or syntactic concepts and at least one context-free grammar having a non-terminal token for a phrase that can be mistaken for one of the desired task dependent semantic or syntactic concepts. The task-independent corpus with the plurality of context-free grammars is parsed to identify word occurrences for each of the semantic or syntactic concepts and phrases. Each of the identified word occurrences is replaced with corresponding non-terminal tokens. A N-gram model is then built having the non-terminal tokens.

A third aspect is a method for creating a language model for a selected application from a task-independent corpus. The method includes obtaining a plurality of context-free grammars comprising non-terminal tokens representing semantic or syntactic concepts of the selected application. Word phrases are generated from the plurality of context-free grammars. The context-free grammars are used for formulating an information retrieval query from at least one of the word phrases. The task-independent corpus is queried based on the query formulated and text in the task-independent corpus is identified based on the query. A language model is built using the identified text.

A fourth aspect is a method for creating a language model for a selected application from a task-independent corpus.

The method includes obtaining a plurality of context-free grammars comprising non-terminal tokens representing semantic or syntactic concepts of the selected application. Word phrases are generated from the plurality of context-free grammars. First and second N-gram language models are built from the word phrases and the task-independent corpus, respectively. The first N-gram language model and the second N-gram language model are combined to form a third N-gram language model.

A fifth aspect is a method for creating a unified language model for a selected application from a corpus. The method includes obtaining a plurality of context-free grammars comprising non-terminal tokens representing semantic or syntactic concepts of the selected application. A word language model is built from the corpus. Probabilities of terminals of at least some of the context-free grammars are normalized and assigned as a function of corresponding probabilities obtained for the same terminals from the word language model.

BRIEF DESCRIPTION OF THE DRAWINGS

FIG. 9 is a block diagram of another aspect of the present invention.

DETAILED DESCRIPTION OF ILLUSTRATIVE EMBODIMENTS

Figure 1:
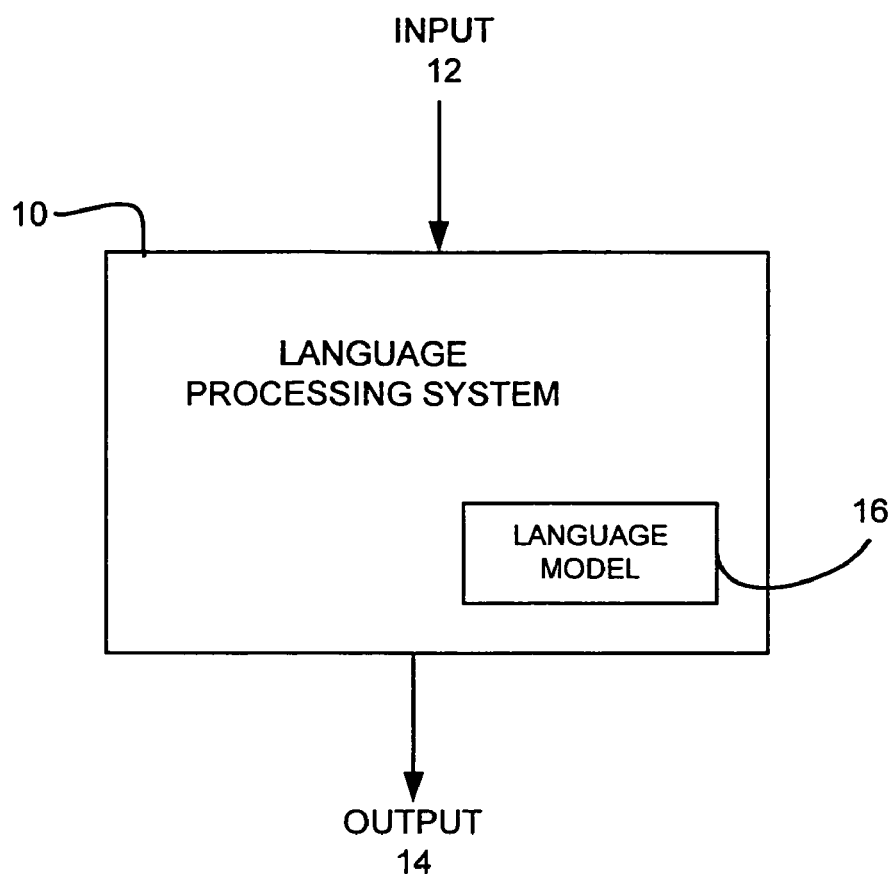
FIG. 1 is a block diagram of a language processing system.

FIG. 1 generally illustrates a language processing system 10 that receives a language input 12 and processes the language input 12 to provide a language output 14. For example, the language processing system 10 can be embodied as a speech recognition system or module that receives as the language input 12 spoken or recorded language by a user. The language processing system 10 processes the spoken language and provides as an output, recognized words typically in the form of a textual output.

During processing, the speech recognition system or module 10 can access a language model 16 in order to determine which words have been spoken. The language model 16 encodes a particular language, such as English. In the embodiment illustrated, the language model 16 can be an N-gram language model or a unified language model comprising a context-free grammar specifying semantic or syntactic concepts with non-terminals and a hybrid N-gram model having non-terminals embedded therein. One broad aspect of the present invention is a method of creating or building the language model 16 from a task-independent corpus, several of which are readily available, rather than from a task-dependent corpus, which is often difficult to obtain.

As appreciated by those skilled in the art, the language model 16 can be used in other language processing systems besides the speech recognition system discussed above. For instance, language models of the type described above can be used in handwriting recognition, Optical Character Recognition (OCR), spell-checkers, language translation, input of Chinese or Japanese characters using standard PC keyboard, or input of English words using a telephone keypad. Although described below with particular reference to a speech recognition system, it is to be understood that the present invention is useful in building artificial and natural language models in these and other forms of language processing systems.

Figure 2:
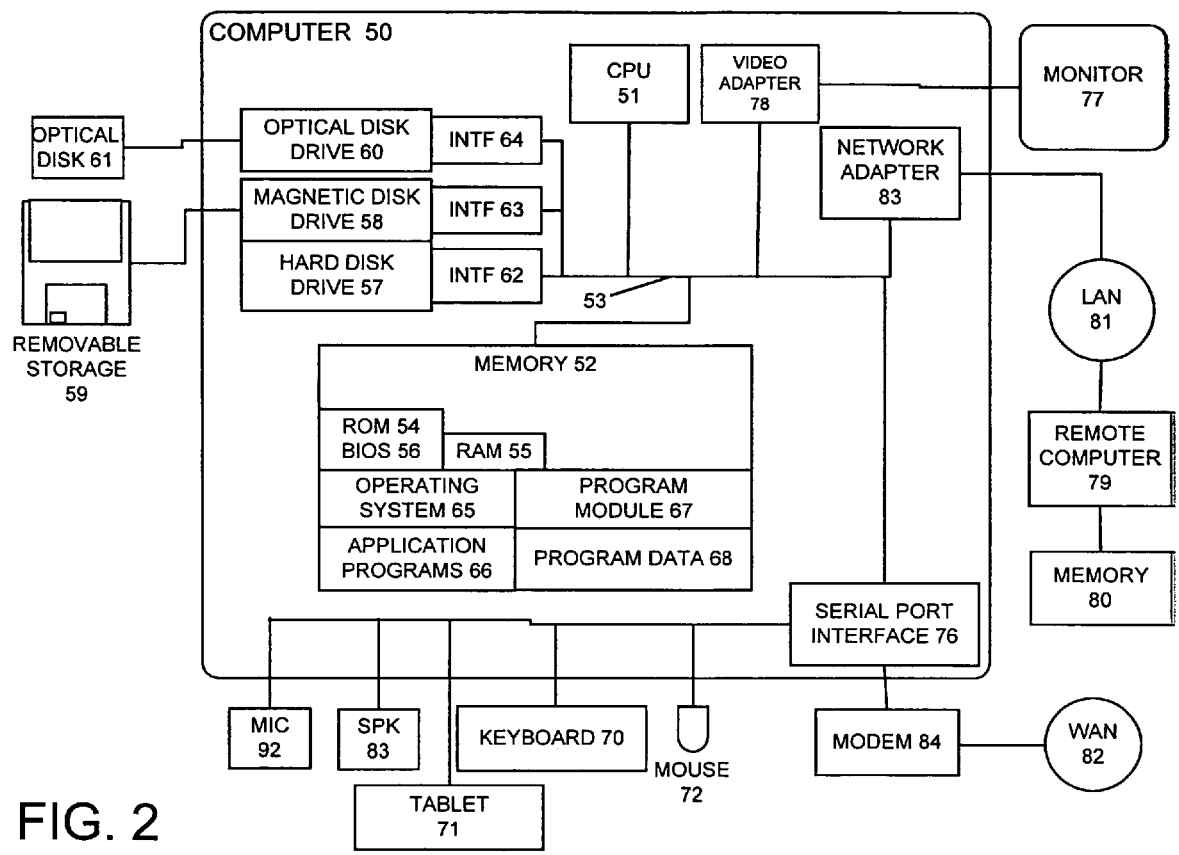
FIG. 2 is a block diagram of an exemplary computing environment.

Prior to a detailed discussion of the present invention, an overview of an operating environment may be helpful. FIG. 2 and the related discussion provide a brief, general description of a suitable computing environment in which the invention can be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium. In addition, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 2, an exemplary system for implementing the invention includes a general purpose computing device in the form of a conventional personal computer 50, including a processing unit 51, a system memory 52, and a system bus 53 that couples various system components including the system memory to the processing unit 51. The system bus 53 can be any of several types of bus structures including a memory bus or memory controller, a peripheral bus, and a local bus using any of a variety of bus architectures. The system memory includes read only memory (ROM) 54 and a random access memory (RAM) 55. A basic input/output system 56 (BIOS), containing the basic routine that helps to transfer information between elements within the personal computer 50, such as during start-up, is stored in ROM 54. The personal computer 50 further includes a hard disk drive 57 for reading from and writing to a hard disk (not shown), a magnetic disk drive 58 for reading from or writing to a removable magnetic disk 59, and an optical disk drive 60 for reading from or writing to a removable optical disk such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer-readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 59, optical disk 61, ROM 54 or RAM 55, including an operating system 65, one or more application programs 66, other program modules 67, and program data 68. A user can enter commands and information into the personal computer 50 through input devices such as a keyboard 70, a handwriting tablet 71, a pointing device 72 and a microphone 92. Other input devices (not shown) can include a joystick, game pad, satellite dish, scanner, or the like. These and other input devices are often connected to the processing unit 51 through a serial port interface 76 that is coupled to the system bus 53, but can be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers typically include other peripheral output devices such as a speaker 83 and a printer (not shown).

The personal computer 50 can operate in a networked environment using logic connections to one or more remote computers, such as a remote computer 79. The remote computer 79 can be another personal computer, a server, a router, a network PC, a peer device or other network node, and typically includes many or all of the elements described above relative to the personal computer 50, although only a memory storage device 80 has been illustrated in FIG. 2. The logic connections depicted in FIG. 2 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which can be internal or external, is connected to the system bus 53 via the serial port interface 76. In a network environment, program modules depicted relative to the personal computer 50, or portions thereof, can be stored in the remote memory storage devices. As appreciated by those skilled in the art, the network connections shown are exemplary and other means of establishing a communications link between the computers can be used.

Figure 3:
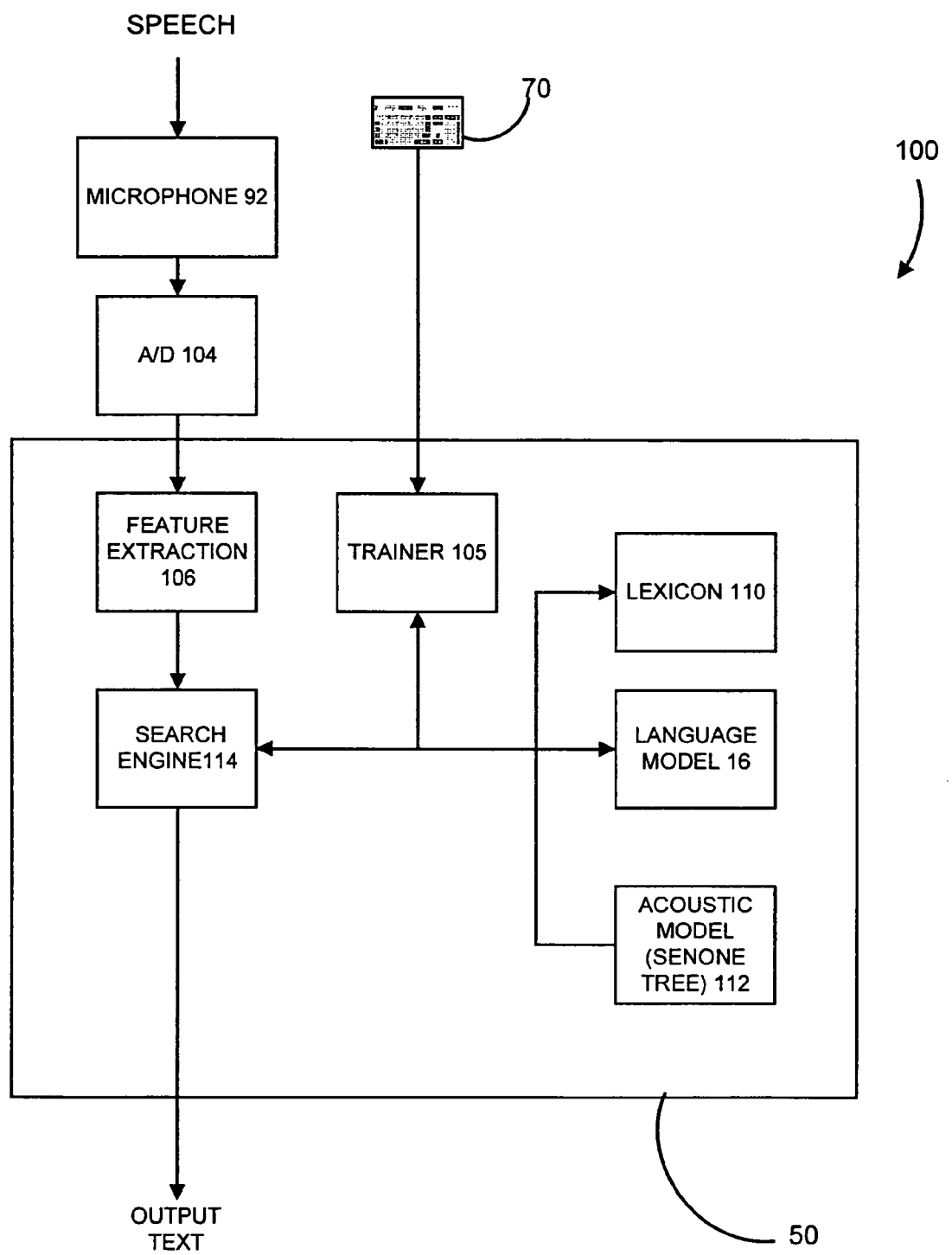
FIG. 3 is a block diagram of an exemplary speech recognition system.

An exemplary embodiment of a speech recognition system 100 is illustrated in FIG. 3. The speech recognition system 100 includes the microphone 92, an analog-to-digital (A/D) converter 104, a training module 105, feature extraction module 106, a lexicon storage module 110, an acoustic model along with senone trees 112, a tree search engine 114, and the language model 16. It should be noted that the entire system 100, or part of speech recognition system 100, can be implemented in the environment illustrated in FIG. 2. For example, microphone 92 can preferably be provided as an input device to the computer 50, through an appropriate interface, and through the A/D converter 104. The training module 105 and feature extraction module 106 can be either hardware modules in the computer 50, or software modules stored in any of the information storage devices disclosed in FIG. 2 and accessible by the processing unit 51 or another suitable processor. In addition, the lexicon storage module 110, the acoustic model 112, and the language model 16 are also preferably stored in any of the memory devices shown in FIG. 2. Furthermore, the tree search engine 114 is implemented in processing unit 51 (which can include one or more processors) or can be performed by a dedicated speech recognition processor employed by the personal computer 50.

In the embodiment illustrated, during speech recognition, speech is provided as an input into the system 100 in the form of an audible voice signal by the user to the microphone 92. The microphone 92 converts the audible speech signal into an analog electronic signal, which is provided to the A/D converter 104. The A/D converter 104 converts the analog speech signal into a sequence of digital signals, which is provided to the feature extraction module 106. In one embodiment, the feature extraction module 106 is a conventional array processor that performs spectral analysis on the digital signals and computes a magnitude value for each frequency band of a frequency spectrum. The signals are, in one illustrative embodiment, provided to the feature extraction module 106 by the A/D converter 104 at a sample rate of approximately 16 kHz.

The feature extraction module 106 divides the digital signal received from the A/D converter 104 into frames that include a plurality of digital samples. Each frame is approximately 10 milliseconds in duration. The frames are then encoded by the feature extraction module 106 into a feature vector reflecting the spectral characteristics for a plurality of frequency bands. In the case of discrete and semi-continuous Hidden Markov Modeling, the feature extraction module 106 also encodes the feature vectors into one or more code words using vector quantization techniques and a codebook derived from training data. Thus, the feature extraction module 106 provides, at its output the feature vectors (or code words) for each spoken utterance. The feature extraction module 106 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 106, the tree search engine 114 accesses information stored in the acoustic model 112. The model 112 stores acoustic models, such as Hidden Markov Models, which represent speech units to be detected by the speech recognition system 100. In one embodiment, the acoustic model 112 includes a senone tree associated with each Markov state in a Hidden Markov Model. The Hidden Markov models represent, in one illustrative embodiment, phonemes. Based upon the senones in the acoustic model 112, the tree search engine 114 determines the most likely phonemes represented by the feature vectors (or code words) received from the feature extraction module 106, and hence representative of the utterance received from the user of the system.

The tree search engine 114 also accesses the lexicon stored in module 110. The information received by the tree search engine 114 based on its accessing of the acoustic model 112 is used in searching the lexicon storage module 110 to determine a word that most likely represents the codewords or feature vector received from the features extraction module 106. Also, the search engine 114 accesses the language model 16. The language model 16 is a unified language model or a word N-gram or a context-free grammar that is used in identifying the most likely word represented by the input speech. The most likely word is provided as output text.

Although described herein where the speech recognition system 100 uses HMM modeling and senone trees, it should be understood that this is but one illustrative embodiment. As appreciated by those skilled in the art, the speech recognition system 100 can take many forms and all that is required is that it uses the language model 16 and provides as an output the text spoken by the user.

As is well known, a statistical N-gram language model produces a probability estimate for a word given the word sequence up to that word (i.e., given the word history H). An N-gram language model considers only (n−1) prior words in the history H as having any influence on the probability of the next word. For example, a bi-gram (or 2-gram) language model considers the previous word as having an influence on the next word. Therefore, in an N-gram language model, the probability of a word occurring is represented as follows:

$$P(w/H) = P(w/w1, w2, \ldots w(n-1)) \tag{1}$$

where w is a word of interest:
w1 is the word located n−1 positions prior to the word w;
w2 is the word located n−2 positions prior to the word w; and
w(n−1) is the first word prior to word w in the sequence.

Also, the probability of a word sequence is determined based on the multiplication of the probability of each word given its history. Therefore, the probability of a word sequence (w1 . . . wm) is represented as follows:
The $$P(w1 \ldots wm) = \prod_{i=1}^{m} (P(w_i / H_i)) \tag{2}$$

N-gram model is obtained by applying an N-gram algorithm to a corpus (a collection of phrases, sentences, sentence fragments, paragraphs, etc) of textual training data. An N-gram algorithm may use, for instance, known statistical techniques such as Katz's technique, or the binomial posterior distribution backoff technique. In using these techniques, the algorithm estimates the probability that a word w(n) will follow a sequence of words w1, w2, . . . w(n−1). These probability values collectively form the N-gram language model. Some aspects of the invention described below can be applied to building a standard statistical N-gram model.

As is also well known in the art, a language model can also comprise a context-free grammar. A context-free grammar provides a rule-based model that can capture semantic or syntactic concepts of sentence structure or spoken language. For instance, by way of example, one set of context-free grammars of a larger plurality of context-free grammars for a software application or task concerning scheduling meetings or sending electronic mail may comprise:
<Schedule Meeting>→<Schedule Command><Meeting Object>;
<Schedule Command>→book;
<Schedule Command>→schedule;
<Schedule Command>→arrange;
etc.
<Meeting Object>→meeting;
<Meeting Object>→dinner;
<Meeting Object>→appointment;
<Meeting Object>→a meeting with <Person>;
<Meeting Object>→a lunch with <Person>;
etc.
<Person>→Anne Weber;
<Person>→Eric Moe;
<Person>→Paul Toman;
etc.

In this example, "< >" denote non-terminals for classifying semantic or syntactic concepts, whereas each of the non-terminals is defined using terminals (e.g. words or phrases) and, in some instances, other non-terminal tokens in a hierarchical structure.

This type of grammar does not require an in-depth knowledge of formal sentence structure or linguistics, but rather, a knowledge of what words, phrases, sentences or sentence fragments are used in a particular application or task.

Figure 4:
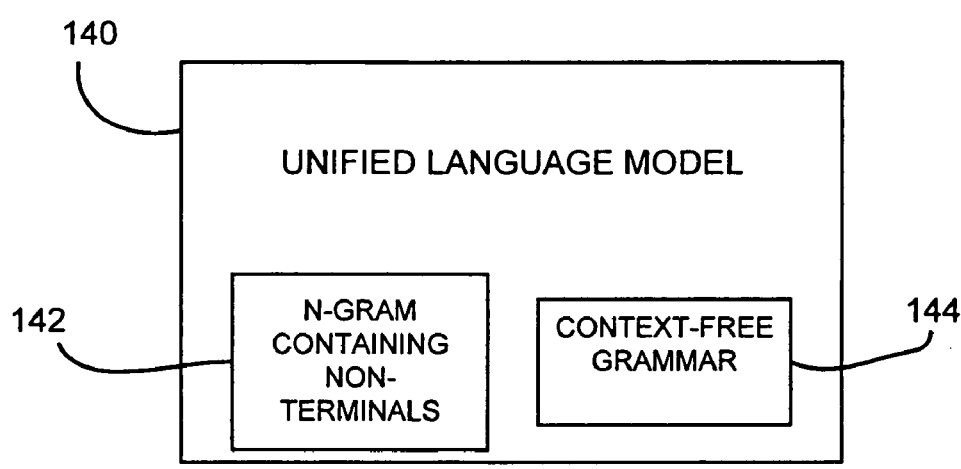
FIG. 4 is a pictorial representation of a unified language model.

A unified language model is also well known in the art. Referring to FIG. 4, a unified language model 140 includes a combination of an N-gram language model 142 and a plurality of context-free grammars 144. Specifically, the N-gram language model 142 includes at least some of the same non-terminals of the plurality of context-free grammars 144 embedded therein such that in addition to predicting words, the N-gram language model 142 also can predict non-terminals. Generally, a probability for a non-terminal can be represented by the following:

$$P(<NT>/h1, h2, \ldots hn) \tag{3}$$

where (h1, h2, . . . hn) can be previous words or non-terminals. Essentially, the N-gram language model 142 (also known as a hybrid N-gram model) of the unified language model 140 includes an augmented vocabulary having words and at least some of the non-terminals.

In use, the speech recognition system or module 100 will access the language model 16 (in this embodiment, the unified language model 140) in order to determine which words have been spoken. The N-gram language model 142 will be used to first predict words and non-terminals. Then, if a non-terminal has been predicted, the plurality of context-free grammars 144 is used to predict terminals as a function of the non-terminals. However, it should be understood, the particular manner in which the unified language model 140 is used is not critical to the present invention.

As mentioned in the Background section, the application developer should be provided with an efficient method in which an appropriate language model 16 can be created for the selected application. In some applications, a standard N-gram language model will work and any improvements in developing such a model will be valuable. While in other applications, a unified language model 140 may work the best, and accordingly, improvements in building such a model will also be valuable.

As different applications are developed for language processing, task-dependent (domain dependent) language models may be more appropriate, due to their increased specificity, which can also make the language models more accurate than a larger, general purpose language model. However, creating a task-dependent language model is not as easy as creating a general purpose language model. To create a general purpose language model, such as an N-gram language model, a task-independent corpus of training data can be used and applied as discussed above to an N-gram algorithm. Task-independent corpora are readily available and can comprise compilations of magazines, newspapers, etc., to name just a few. The task-independent corpora are not directed at any one application, but rather provide many examples of how words are used in a language. Task-dependent corpora, on the other hand, are typically not available. These corpora must be laboriously compiled, and even then, may not be very complete.

A broad aspect of the invention includes a method for creating a task or domain dependent unified language model for a selected application from a task-independent corpus. The task-dependent unified language model includes embedded context-free grammar non-terminal tokens in an N-gram language model. As discussed above, the task-independent corpus is a compilation of sentences, phrases, etc. that is not directed at any one particular application, but rather, generally shows, through a wide variety of examples, how words are ordered in a language. Various techniques, described below, have been developed to use the task-independent corpus for creating a language model suitable for a task-dependent application.

Figure 5:
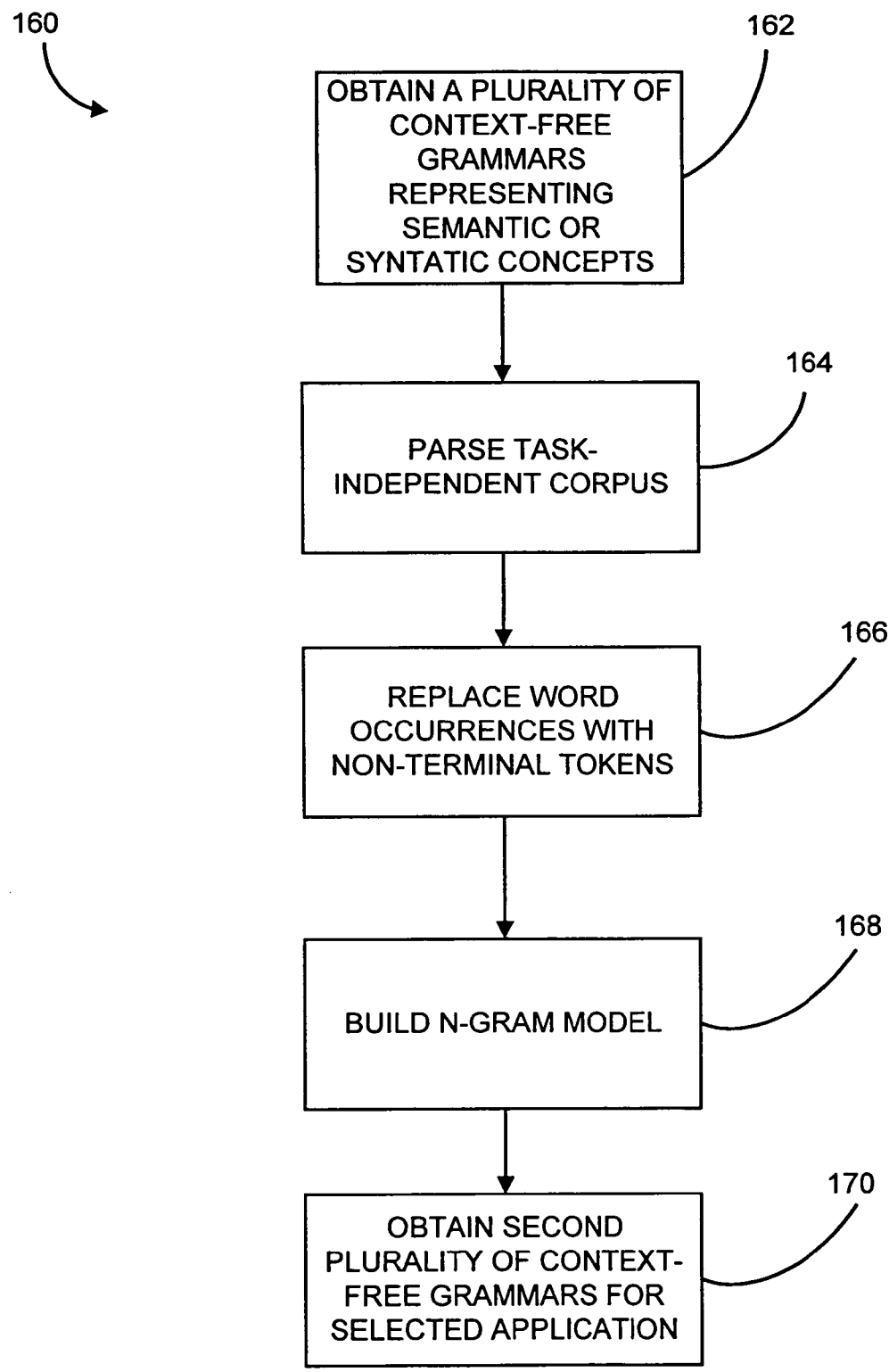
FIGS. 5-8 are flow charts for different aspects of the present invention.

FIG. 5 illustrates a first method 160 for creating or building a language model. The method 160 includes a step 162 for obtaining a plurality of context-free grammars comprising non-terminal tokens representing semantic or syntactic concepts. As used herein, a "semantic or syntactic concept" includes word or word phrases that represent particular word usages for various commands, objects, actions, etc. For instance, the task-independent corpus includes various instances of how proper names are used. For example, the task-independent corpus could have sentences like: "Bill Clinton was present at the meeting" and "John Smith went to lunch at the conference". Although the words used to form the semantic or syntactic concepts in the task-independent corpus may not be those used for the task-dependent application, the task-independent corpus does provide usable examples illustrating the context for the semantic or syntactic concepts. Step 162 represents obtaining context-free grammars having non-terminal tokens to represent the semantic or syntactic concepts in the task-independent corpus, the non-terminal tokens having terminals present in the task-independent corpus. For instance, using the proper name example provided above, an example CFG can be the following:

<Person>→<Common First Name>[<Common Last Name>];
    <Common First Name>→John|Bob|Bill| . . . ; (first names present in the task-independent corpus)
    <Common Last Name>→Smith|Roberts|Clinton| . . . ; (last names present in the task-independent corpus).

Commonly, a plurality of context-free grammars comprising non-terminal tokens representing various semantic or syntactic concepts are used. For instance, other semantic or syntactic concepts include geographical places, regions, titles, dates, times, currency amounts, and percentage amounts to name a few. However, it should be understood that these semantic or syntactic concepts are merely illustrative and are not required for practicing the present invention, nor is this list exhaustive of all types of semantic or syntactic concepts, which will depend greatly upon the intended application.

At step 164, the task-independent corpus is parsed with the plurality of context-free grammars obtained in step 162 in order to identify word occurrences in the task-independent corpus of each of the semantic or syntactic concepts.

At step 166, each of the identified word occurrences is replaced with the corresponding non-terminal tokens of step 164. An N-gram model is then built at step 168 using an N-gram algorithm, the N-gram model having the non-terminal tokens embedded therein.

At step 170, a second plurality of context-free grammars is obtained suitable for the selected application. In particular, the second plurality of context-free grammars includes at least some of the same non-terminal tokens representing the same semantic or syntactic concepts of step 162. However, each of the context-free grammars of the second plurality is more appropriate for the selected application. Referring back to the proper name example provided above, the second plurality of context-free grammars could include a CFG:

<Person>→<Titan Incorporated Employee Name>;
    <Titan Incorporation Employee Name>→XD|Ye-Yi|Milind|Xiaolong| . . . ; (names of employees in Titan Incorporated).

Method 160 can be implemented in computer 50 wherein each of the context-free grammars and the task-independent corpus are stored on any of the local or remote storage devices. Preferably, the N-gram model having the non-terminal tokens and the second plurality of context-free grammars having non-terminal tokens representing task dependent semantic or syntactic concepts are stored on a computer readable medium accessible by the speech recognizer 100.

Figure 6:
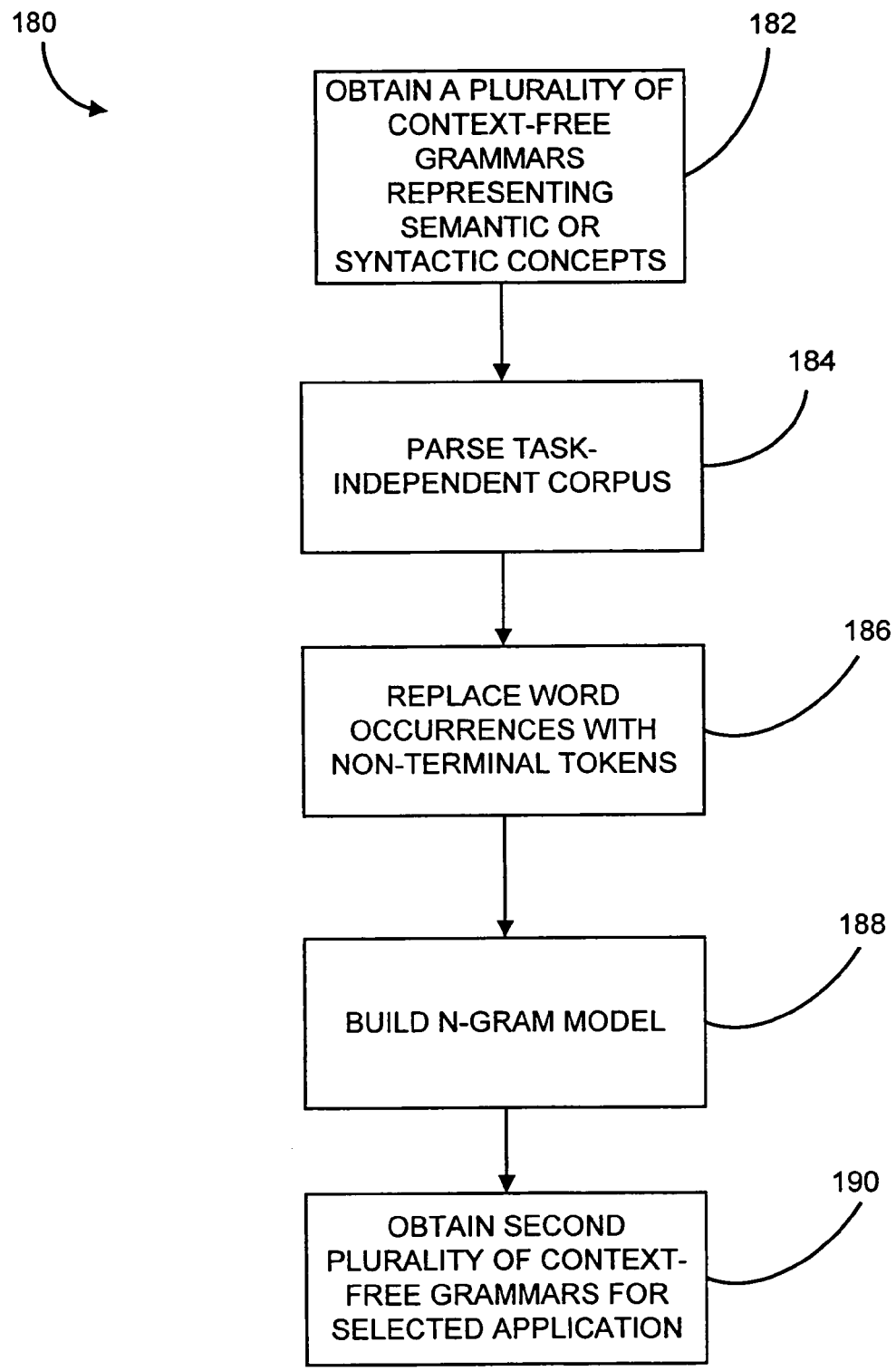

FIG. 6 illustrates a method 180 for creating a unified language model for a selected application from a task-independent corpus that includes a large number of phrases that may be of different context. Simple parsing of the task-independent corpus with context-free grammars for the task-dependent application may cause errors, which will then propagate to the N-gram model upon application of an N-gram algorithm. In order to reduce the errors during parsing, this aspect of the invention includes using at least one context-free grammar having a non-terminal token for a phrase (word or words) that can be mistaken for one of the desired task-dependent semantic or syntactic concepts. In particular, at step 182, a plurality of context-free grammars is obtained. The plurality of context-free grammars includes the set of context-free grammars having non-terminal tokens representing task-dependent semantic or syntactic concepts (i.e. the semantic or syntactic concepts directly pertaining to the selected application) and, at least one context-free grammar having a non-terminal token for a phrase that can be mistaken for one of the desired task-dependent semantic or syntactic concepts. For example, a task-dependent application may require modeling the day of the week as a semantic concept in the N-gram model. A context-free grammar of the following form could be used during parsing of the task-independent corpus:

<Day>→Monday|Tuesday| . . . |Sunday|;

However, the task-independent corpus might contain references to a person called "Joe Friday". In order to keep "Friday" as the last name in this instance and, in order to prevent this instance from being parsed as a day, which would then introduce an error into the N-gram model, the plurality of context-free grammars can include a context-free grammar of the form:

<Person With Last Name Friday>→(Joe|Bill|Bob| . . . )Friday; (various first names having the last name "Friday").

In this manner, during parsing of the task-independent corpus, instances of days of the week will be identified separate from instances where "Friday" is the last name of an individual.

Step 184 represents parsing the task-independent corpus with the plurality of context-free grammars to identify word occurrences for each of the semantic or syntactic concepts. At step 186, each of the identified word occurrences for non-terminals representing concepts which are of interest to the target application is replaced with the corresponding non-terminal token as defined by the corresponding context-free grammar. In other words, the word sequences identified with the extraneous non-terminals which were introduced to prevent parsing errors (such as <Person With Last Name Friday> in the example above) are not replaced with the corresponding non-terminal. An N-gram model can then be built having the non-terminal tokens embedded therein as indicated at step 188. Step 190 is similar to Step 170 and includes obtaining a second set of context-free grammars suited for the selected application.

Used during language processing such as speech recognition, the N-gram model having the non-terminal tokens and the plurality of context-free grammars associated with the task-dependent application is stored on a computer readable medium accessible by the speech recognition module 100. However, it is not necessary to include context-free grammars associated with the phrases that can be mistaken for one of the desired task-dependent semantic or syntactic concepts because these context-free grammars are used only to properly parse the task-independent corpus. The phrases associated with these grammars would not normally be spoken in the selected application. Thus, the extent or size of the plurality of context-free grammars is less during speech recognition, corresponding to less required storage space in the computer 50 than was used for parsing the task-independent corpus.

In one embodiment, step 188 associated with building the N-gram model can include eliminating at least some of the associated text from the task-independent corpus for non-terminal tokens that can be mistaken for one of the desired task-dependent semantic or syntactic concepts. In this manner, the size of the task-independent corpus is reduced prior to parsing so that method 180 may execute more quickly.

It should also be noted that method 180 can include an additional step of examining the parsed task-independent corpus, or the resulting N-gram model, in order to ascertain errors due to phrases (word or words) that are mistaken for one of the desired task-dependent semantic or syntactic concepts. Appropriate context-free grammars can then be determined and included in the plurality of context-free grammars at step 182. Steps 184 to 188 can then be performed as necessary to reexamine the parsed task-independent corpus or N-gram model to ascertain if the errors have been corrected. This iterative process can be repeated as necessary until the errors are corrected and a suitable N-gram model has been obtained.

As discussed above, the task-independent corpus is a general corpus and in fact it is likely that most of the corpus is unrelated to the task or application that the developer is interested in. Nevertheless, the task-independent corpus may contain some text that is relevant to the task or the application. Generally, another aspect of the present invention includes using the context-free grammars for the task-dependent application to form phrases, sentences or sentence fragments that can then be used as queries in an information retrieval system. The information retrieval system examines the task-independent corpus and identifies portions similar to the query. The identified text of the task-independent corpus is more relevant to the selected task or application; therefore, a language model derived from the identified text may be more specific than a language model based on the complete task-independent corpus. In addition, although someone who knows about the specific task or application wrote the context-free grammars, he may not know all the various word sequences that can be used for the task or application. This technique narrows the task-independent corpus, but can identify yet more examples of task specific sentences, phrases, etc.

Figure 7:
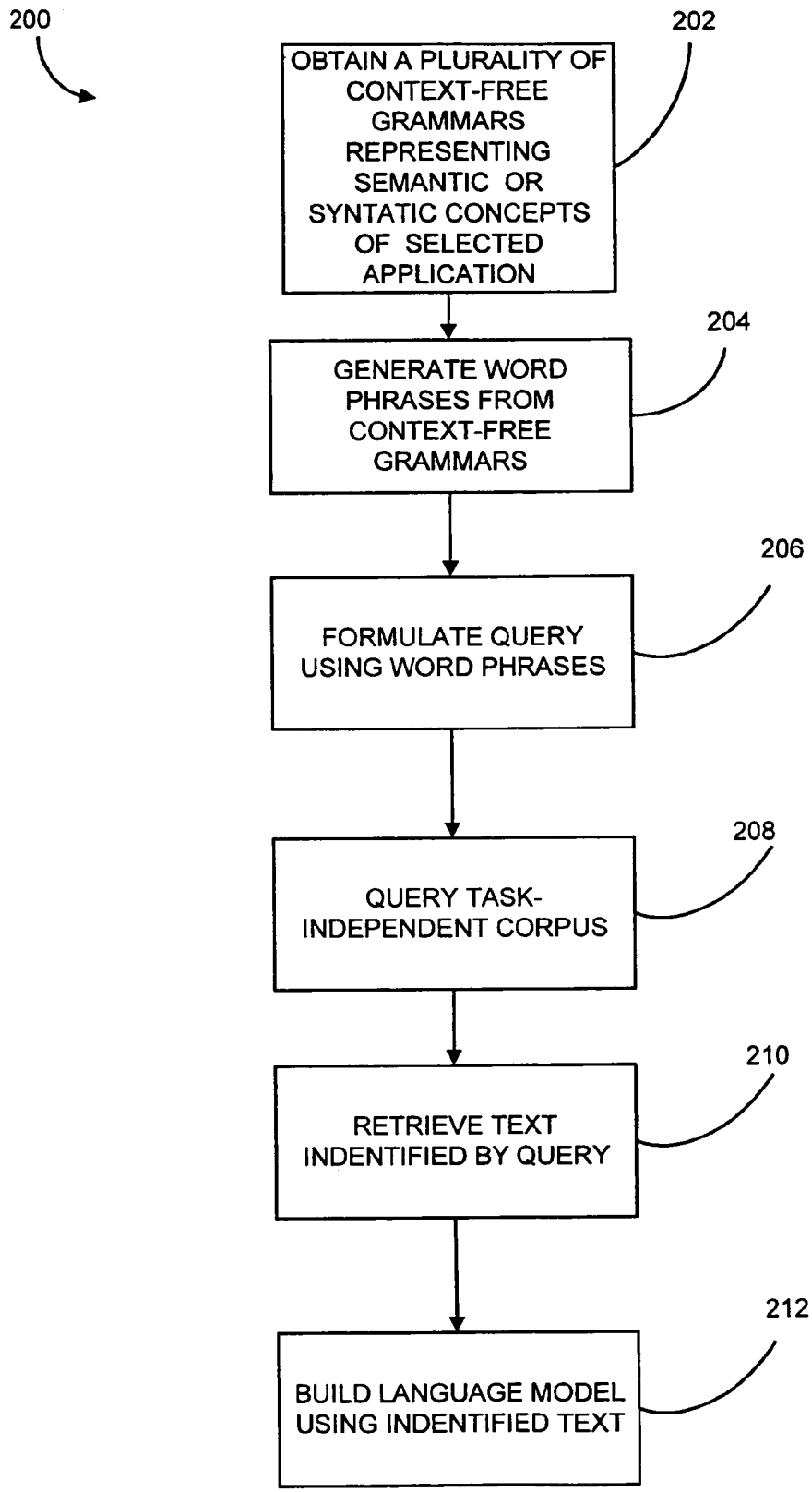

FIG. 7 illustrates a method 200 for creating a language model for a selected application from a task-independent corpus in the manner discussed above. Step 202 includes obtaining a plurality of context-free grammars comprising non-terminal tokens representing semantic or syntactic concepts of the selected application. As described above, commonly the context-free grammars are written by a developer having at least some knowledge of what phrases may be used in the selected application for each of the semantic or syntactic concepts, but the extent of knowledge about such phrases is not complete. At step 204, word phrases are generated from the plurality of context-free grammars. The word phrases can include some or all of the various combinations and permutations defined by the associated context-free grammars where the non-terminal tokens include multiple words.

At step 206, at least one query is formulated for an information retrieval system using at least one of the generated word phrases. The query can be generated using a statistical "bag of words" technique which uses TF-IDF vectors. Similarity between the query and segments of the task-independent corpus can be computed using cosine similarity measure. These are generally well-known techniques in the field of information retrieval. Alternatively, the query can include Boolean logic ("and", "or", etc.) as may be desired to combine word phrases. However, each query could be simply a separate word phrase, as appreciated by those skilled in the art.

At step 208, the task-independent corpus is queried based on the query formulated. The particular information retrieval technique used to generate and execute the query against the task-independent corpus is not critical to this feature of the present invention. Rather, any suitable query development and information retrieval technique can be used. It should simply be noted that the language model created from the identified text according to the present technique works better with information retrieval techniques that identify more relevant text of the task-independent corpus.

The text identified in the task-independent corpus based on the query is indicated at step 210. A language model can then be built using the identified text as represented at step 212.

At this point, it should be noted that the method illustrated in FIG. 7 is not limited to a unified language model, or even an N-gram language model, but rather, can be helpful in forming language models of any type used in a language processing system where the model is based on a task-independent corpus. Nevertheless, the method 200 is particularly useful in building an N-gram language model. In the case of an N-gram language model or a hybrid N-gram language model, step 212 will commonly require use of an N-gram algorithm.

Figure 8:
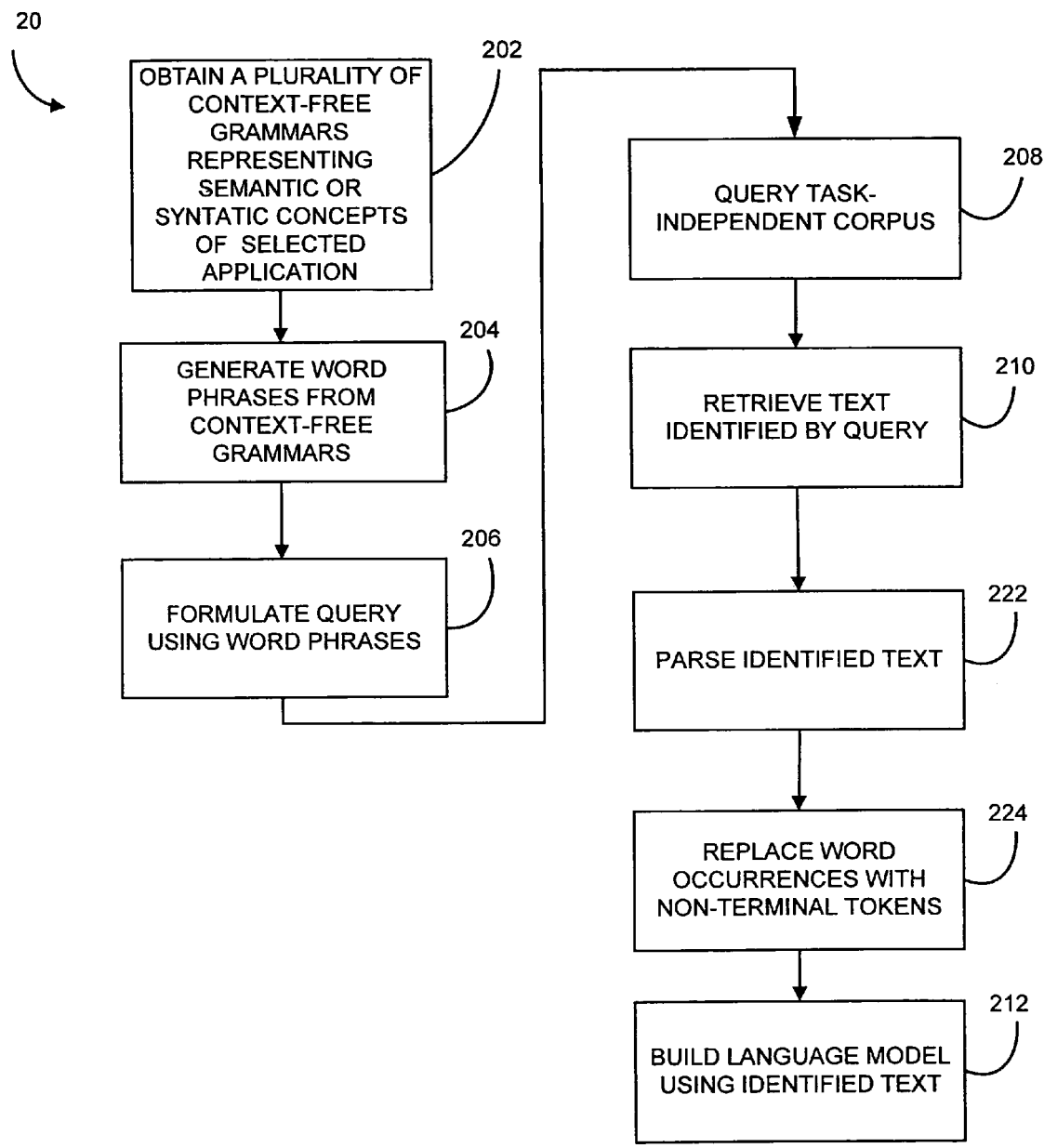

FIG. 8 illustrates a method 220 similar to the method 200 of FIG. 7 wherein the same reference numerals have been used to identify similar steps. However, method 220 can be used to create an N-gram language model having the non-terminal tokens of the context-free grammars. In addition to the steps described above, method 220 also includes parsing the identified text of the task-independent corpus with a plurality of context-free grammars to identify word occurrences for each of the semantic or syntactic concepts as indicated at step 222. Step 224 then includes replacing each of the identified word occurrences with corresponding non-terminal tokens for selected non-terminals (i.e. excluding the non-terminals which may have been introduced to prevent mistakes during parsing). Step 212 would then include building an N-gram model having non-terminal tokens. In both methods 200 and 220, the relevant text is identified in the task-independent corpus. If desired, the identified text can be extracted, copied or otherwise stored separate from the task-independent corpus as an aid in isolating relevant text and providing easier processing.

FIG. 9 is a block diagram illustrating another aspect of the present invention. Generally, this aspect includes forming an N-gram language model from the word phrases obtained from the context-free grammars and combining the N-gram language model with another N-gram language model based on the task-independent corpus. In the embodiment illustrated in FIG. 9, block 240 represents the context-free grammars obtained (for example, authored by the developer) for the selected task or application. The context-free grammars are used to generate synthetic data or word phrases 242 in a manner similar to step 204 of methods 200 and 220. The word phrases 242 are then provided to an N-gram algorithm 244 to build a first N-gram language model 246.

FIG. 9 also illustrates in block diagram form steps 206, 208, and 210 where the context-free grammars are used to formulate an information retrieval query from at least one of the phrases, query the task-independent corpus based on the query formulated, identify associated text in the task-independent corpus based on the query, and build a second N-gram language model from the identified text. Block 248 illustrates application of an N-gram algorithm to obtain the second N-gram language model 250.

A third N-gram language model 252 is formed by combining the first N-gram language model 246 and the second N-gram language model 250. This combination can be performed using any known smoothing technique, such as interpolation, deleted interpolation, or any other suitable technique. If desired, the second language model can be weighted based on whether the identified text is believed to be accurate. The weighting can be based on the amount of text identified in the task-independent corpus, the number of queries used, etc.

In another embodiment, non-terminal tokens representing semantic or syntactic concepts can be inserted into the identified text, or the task-independent corpus in order that the second N-gram language model includes non-terminal tokens. This option is illustrated in dashed lines for block 264 and arrows 266 and 268. Of course, if this option is chosen the identified text 210 would not be provided directly to the N-gram algorithm 248, but rather to block 264. The non-terminal tokens inserted into the identified text or the task-independent corpus can be based on the context-free grammars obtained at block 240, or alternatively, based on another set of context-free grammars 270 that includes other context-free grammars for the reasons discussed above. When the third N-gram language model 252 is built having non-terminals, the word phrases or synthetic data at block 242 typically will also include the non-terminals as well.

When the context-free grammars are used to generate synthetic data, probabilities for the word phrases formed with the non-terminals and the terminals of the non-terminals can be chosen as desired; for instance, each can be assigned equal probability.

The task-dependent unified language model includes embedded context-free grammar non-terminal tokens in an N-gram as well as a plurality of context-free grammars defining the non-terminal tokens. Inside each context-free grammar, the standard probabilistic context-free grammar can be used. However, without real data pertaining to the specific task or application, an estimate for each of the terminal probabilities cannot be easily determined. In other words, the developer can author or otherwise obtain the plurality of context-free grammars; however, an estimate of the probabilities for each of the terminals may not be readily known. Although a uniform distribution of probabilities can be used, another aspect of the present invention includes assigning probabilities to terminals of at least some of the context-free grammars as a function of corresponding probabilities obtained for the same terminals from the N-gram language model built from the task-independent corpus. Preferably, assigning probabilities to terminals of the context-free grammars includes normalizing the probabilities of the terminals from the N-gram language model in each of the context-free grammars as a function of the terminals in the corresponding context-free grammar. In other words, the context-free grammar constrains or defines the allowable set of terminals from the N-gram language model. Therefore, probabilities of the terminals from the N-gram language model need to be appropriately normalized in the same probability space as the terminals present in the corresponding context-free grammar.

In one embodiment, an input utterance $W=w_1 w_2 \ldots w_s$ can be segmented into a sequence $T=t_1 t_2 \ldots t_m$ where each $t_i$ is either a word in W or a context-free grammar non-terminal that covers a sequence of words $\overline{u}_{t_i}$ in W. The likelihood of W under the segmentation T is therefore $$P(W, T) = \prod_{i=1}^{m} P(t_i | t_{i-2}, t_{i-1}) \prod_{i=1}^{m} P(\overline{u_{t_i}} | t_i) \qquad (4)$$

In addition to tri-gram probabilities, we need to include $P(\overline{u}_{t_i}|t_i)$, the likelihood of generating a word sequence $\overline{u}_{t_i}=[u_{t_i,1} u_{t_i,2} \ldots u_{t_i,k}]$ from the context-free grammar non-terminal $t_i$. In the case when $t_i$ itself is a word ($\overline{u}_{t_i}=[t_i]$), $P(\overline{u}_{t_i}|t_i)=1$. Otherwise, $P(\overline{u}_{t_i}|t_i)$ can be obtained by predicating each word in the sequence on its word history:

$$P(\overline{u_{t_i}}|t_i) = \left[ \prod_{l=1}^{\|\overline{u}_{t_i}\|} P(u_{t_i,l}|u_{t_i,1}, \ldots, u_{t_i,l-1}) \right] P(</s>|\overline{u_{t_i}})$$

Here </s> represents the special end-of-sentence word. Three different methods are used to calculate the likelihood of a word given history inside a context-free grammar non-terminal.

A history $h=u_{t_i,1} u_{t_i,2} \ldots u_{t_i,l-1}$ corresponds to a set Q (h), where each element in the set is a CFG state generating the initial l–1 words in the history from the non-terminal $t_i$. A CFG state constrains the possible words that can follow the history. The union of the word sets for all of the CFG states in Q(h), $W_Q(h)$ defines all legal words (including the symbol "</s>" for exiting the non-terminal $t_i$ if $t_i \Rightarrow u_{t_i,1} u_{t_i,2} \ldots u_{t_i,l-1}$) that can follow the history according to the context-free grammar constraints. The likelihood of observing $u_{t_i,l}$ following the history can be estimated by the uniform distribution below:

$$P(u_{t_i,l}|h)=1/\|W_Q(h)\| \qquad (6)$$

The uniform model does not capture the empirical word distribution underneath a context-free grammar non-terminal. A better alternative is to inherit existing domain-independent word tri-gram probabilities. These probabilities need to be appropriately normalized in the same probability space. Even though we have used word tri-gram models to illustrate the technique, it should be noted that any word-based language model can be used here including word-level N-grams with different N. Also, the technique is applicable irrespective of how the word language models are trained (in particular whether task-independent or task-dependent corpus is used). Thus we have:

$$P(u_{t_i,l}|h) = \frac{P_{word}(u_{t_i,l}|u_{t_i,l-2}, u_{t_i,l-1})}{\sum_{w \in W_Q(h)} P_{word}(w|u_{t_i,l-2}, u_{t_i,l-1})} \quad (7)$$

Another way to improve the modeling of word sequence covered by a specific CFG non-terminal is to use a specific word tri-gram language model $P_t(w_n|w_{n-2}, w_{n-1})$ for each non-terminal t. The normalization is performed the same as in Equation (7).

Multiple segmentations may be available for W due to the ambiguity of natural language. The likelihood of W is therefore the sum over all segmentations S(W):

$$P(w) = \sum_{T \in S(W)} P(W, T) \quad (8)$$

Although the present invention has been described with reference to preferred embodiments, workers skilled in the art will recognize that changes may be made in form and detail without departing from the spirit and scope of the invention.

What is claimed is:

1. A system, comprising:
   memory;
   a processor adapted to access the memory;
   instructions stored on the memory that are executable by the processor which, when implemented, execute a method to build a task dependent unified language model, the method comprising:
      accessing a plurality of context-free grammars comprising non-terminal tokens representing semantic or syntactic concepts, each of the context-free grammars having words present in a task independent corpus to form the semantic or syntactic concepts;
      parsing the task independent corpus with the plurality of context-free grammars to identify word occurrences of each of the semantic or syntactic concepts;
      replacing each of the identified word occurrences with corresponding non-terminal tokens;
      building a N-gram model having the non-terminal tokens; and
      storing the N-gram model and a second plurality of context-free grammars comprising at least some of the same non-terminals representing the same semantic or syntactic concepts in the memo, each of the context-free grammars of the second plurality being more appropriate for use in the selected application.

2. The system of claim 1 wherein the plurality of context-free grammars include at least one context-free grammar having a non-terminal token for a phrase that can be mistaken for one of the desired task dependent semantic or syntactic concepts.

3. The system of claim 2 wherein replacing each of the identified word occurrences with corresponding non-terminal tokens includes excluding the non-terminals added for the prevention of mistakes during parsing.

4. The system of claim 2 having instructions further comprising:
   storing the N-gram model having the non-terminal tokens and the set of context-free grammars having non-terminal tokens representing task dependent semantic or syntactic concepts on the memory.

5. The system of claim 2 wherein building the N-gram model includes eliminating at least some of the associated text from the task independent corpus for non-terminal tokens that can be mistaken for one of the desired task dependent semantic or syntactic concepts.

6. A system, comprising:
   memory;
   a processor adapted to access the memory;
   instructions stored on the memory and executable by the processor which, when implemented, execute a method to build a language model, the method comprising:
      accessing a plurality of context-free grammars comprising non-terminal tokens representing semantic or syntactic concepts of the selected application;
      generating word phases from the plurality of context-free grammars;
      formulating an information retrieval query from at least one of the word phases;
      querying a task independent corpus based on the query formulated;
      identifying associated text in the task independent corpus based on the query; and
      building the language model using the identified text for storage on the memory.

7. The system of claim 6 wherein the language model is an N-gram language model.

8. The system of claim 7 and having instructions further comprising:
   parsing the identified text of the task independent corpus with the plurality of context-free grammars to identify word occurrences for each of the semantic or syntactic concepts;
   replacing each of the identified word occurrences with corresponding non-terminal tokens; and
   wherein building the N-gram language model comprises building a N-gram model having the non-terminal tokens.

9. The system of claim 7 and having instructions further comprising:
   building a second N-gram language model from the word phases from the plurality of context-free grammars; and
   combining the first-mentioned N-gram language model and the second N-gram language model to form a third N-gram language model.

10. The system of claim 9 and having instructions further comprising:
    parsing the identified text of the task independent corpus with the plurality of context-free grammars to identify word occurrences for each of the semantic or syntactic concepts;
    replacing each of the identified word occurrences with corresponding non-terminal tokens; and
    wherein the word phrases include non-terminal tokens and wherein building the first-mentioned N-gram language model comprises building a N-gram model having the non-terminal tokens.

11. The system of claim 8 and having instructions further comprising:
storing the N-gram model having the non-terminal tokens and the plurality of context-free grammars having non-terminal tokens representing task dependent semantic or syntactic concepts on the memory.

12. The system of claim 6 and having instructions further comprising:
storing the identified text of the task independent corpus separate from the task independent corpus.

13. The system of claim 9 wherein building the second N-gram language model includes using only the identified text.

14. The system of claim 13 and having instructions further comprising:
storing the identified text of the task independent corpus separate from the task independent corpus.

15. A system, comprising:
memory;
a processor adapted to access the memory;
instructions stored on the memory and executable by the processor which, when implemented, execute a method to build a unified language model for a selected application, the method comprising:
accessing a plurality of context-free grammars comprising non-terminal tokens representing semantic or syntactic concepts of the selected application;
building a word language model from a corpus; and
assigning probabilities to words of at least some of the context-free grammars as a function of corresponding probabilities obtained for the same terminals from the word language model wherein assigning probabilities includes normalizing the probabilities of the words from the word language model in each of the context-free grammars as a function of the words allowed by the corresponding context-free grammar.

16. The system of claim 15 wherein the word language model comprises an N-gram language model and wherein the corpus comprises a task independent corpus.

17. The system of claim 16 and having instructions further comprising:
generating word phrases from the plurality of context-free grammars;
formulating an information retrieval query from at least one of the word phrases;
querying the task independent corpus based on the query formulated;
identifying associated text in the task independent corpus based on the query; and
wherein building a N-gram language model includes using the identified text.

* * * * *